| United States Patent [19] | [11] 3,978,036 |
|---|---|
| Pollard | [45] Aug. 31, 1976 |

[54] METHOD OF COLORING AND MOLDING A SHAPED THERMOPLASTIC RESIN ARTICLE

[75] Inventor: Edward T. Pollard, Vermilion, Ohio

[73] Assignee: PMS Consolidated, Somerset, N.J.

[22] Filed: Aug. 2, 1974

[21] Appl. No.: 494,340

Related U.S. Application Data

[62] Division of Ser. No. 310,022, Nov. 28, 1972, Pat. No. 3,844,810, which is a division of Ser. No. 129,968, March 31, 1971, Pat. No. 3,728,143.

[52] U.S. Cl. .................................. 264/140; 264/328
[51] Int. Cl.$^2$ ............................................. B29F 1/00
[58] Field of Search ............. 264/75, 115, 122, 328, 264/299, 7, 140, 134; 260/42.57; 106/308 F; 427/212, 220, 140

[56] References Cited
UNITED STATES PATENTS

| 3,394,210 | 7/1968 | Franze | 264/75 |
| 3,706,825 | 12/1972 | Hall et al. | 264/75 |

Primary Examiner—Robert F. White
Assistant Examiner—James R. Hall
Attorney, Agent, or Firm—Christen & Sabol

[57] ABSTRACT

Fatty acid amide coated pigments are obtained and used to formulate with uncolored thermoplastic materials. The colors of the pigments are fully developed and extremely high pigment loadings are obtained. The coated pigments are formed by admixing the pigment with melted fatty acid amide; solidifying the material by cooling it; grinding the material; and separating out the fines. The coated pigments particles are compounded with thermoplastic materials by low shear means, such as, injection molding. An improved form of the coated pigments can be obtained by admixing the melted fatty acid amide, and the pigment; extruding the admixture to form a creamy mass; solidifying and forming the creamy mass by passing it through cold and forming rollers; grinding the resultant wafer-like material; and separating out the fines.

2 Claims, No Drawings

METHOD OF COLORING AND MOLDING A SHAPED THERMOPLASTIC RESIN ARTICLE

This is a division of application Ser. No. 310,022, filed Nov. 28, 1972, now U.S. Pat. No. 3,844,810, which is a division of application Ser. No. 129,968, filed Mar. 31, 1971, now U.S. Pat. No. 3,728,143.

BACKGROUND OF THIS INVENTION

1. Field of This Invention

This invention relates to a process of dry coloring and molding a shaped article.

2. Prior Art

U.S. Pat. No. 2,971,922 teaches compositions of clay rendered organophilic by admixture with a fatty acid amide. The admixture can contain from 30 to 75 percent of the fatty acid amide, the remainder being clay. The fatty acid amide is heated to 250° to 400°F.; the clay added (preferably with stirring); the admixture allowed to cool; and the admixture is then ground to a fine waxy powder. The organophilic clay is used in the production of foundry core compositions.

U.S. Pat. No. 2,442,972 teaches treating textiles, nylon vinyl resins and cellophane with aqueous dispersions containing pigments, coupling agents, such as, fatty acid amides of acyl or hyroxyacyl amines, and cationic materials, such as, mono-amides obtained by the condensation of amines with one mole of a fatty acid. The pigments, which are dispersed in fatty acid amides and water, are used on textiles, the result being a flattening or dulling of the surface lustre (see col. 6, lines 61 to 66). Thus one of ordinary skill is lead away from investigating the use of fatty acid amides to increase the lustre of pigments dispersed in thermoplastics.

U.S. Pat. No. 3,441,507 teaches coating powdered peroxygen compounds with a combination of (a) a nitrogenous condensation product of a fatty acid and alkyl amine or alkylol amine and (b) an ester of glycerin and a fatty acid. The product is used detergent products.

U.S. Pat. No. 3,328,185 teaches placing filler particles of calcium carbonate or carbon black into a melted polyamide and admixing them, thus forming a hot melt dispersion. The dispersion is maintained at a hot melt temperature. (The dispersion, in Example XIV, was extruded into a rod. The rod was cut and the pieces were allowed to solidify to form pellets. The pellets were placed in a drum and the temperature was maintained at 100°F.) The dispersions are used in bonding the side seams in paper cups and cans (tin-plated sheet).

U.S. Pat. No. 2,385,379 teaches compacting calcium carbonate by passing it through a roller. The rollers can be treated (coated) before compacting with a variety of substances such as, fatty acids or salts of fatty acids, but nowhere is any fatty acid amide mentioned. U.S. Pat. No. 2,192,956 discloses treating a slurry of a pigment and water with a cation-active agent which is an ester formed form a fatty acid and a hydroxy amine; drying the treated pigment; and grinding the pigment. The treated pigment was to be used in the field of textiles. U.S. Pat. No. 2,841,504 teaches surface coating calcium carbonate pigments for use as rubber reinforcing pigments, in printing inks and surface-coating compositions. The calcium carbonate is coated with a higher amine and a fatty acid by adding emulsions of the amine and fatty acid to aqueous slurries of the calcium carbonate. The emulsion is prepared by melting together the amine and fatty acid and then adding the melt to boiling water. Or an amine and calcium carbonate aqueous solution is prepared; the solution dried; and a fatty acid incorporated on the dried product by hammermilling. Several other slurry and solvent methods of preparation are taught. U.S. Pat. No. 2,927,091, is similar and also does not teach applicants' invention.

U.S. Pat. No. 3,075,849 discloses the use of a salt of a basic polyamide (of an aliphatic polyamine and an unsaturated higher fatty acid) with a higher fatty acid as a suspending agent for pigments in paints. U.S. Pat. No. 3,278,479 teaches polyester resins containing kaolin clay coated with an ethoxylated amide. U.S. Pat. No. 3,266,924 teaches adding a fatty acid amide slip agent to a mixing zone which contains siliceous material particles and which is at a temperature between 160° and 240°F. The admixture is cooled so that the amide solidifies and the resultant powder is recovered. The powder is used in polyethylene and copolymers thereof as a slip and antiblocking agent.

U.S. Pat. No. 3,075,849 disclosed a pigmented paint which is a pigment suspended in a vehicle. The suspension contains a suspending agent which is a salt of the basic polyamide (of an aliphatic polyamine and an unsaturated higher fatty acid) with a higher fatty acid.

U.S. Pat. No. 2,638,702 teaches making an organophilic pigment. The pigment is slurried with an aqueous dispersion of a low molecular weight condensate of an alkylated methylol melamine and a N-alkylol fatty acid amide. The mixture is dried and then cured at an elevated temperature. The pigment is stated to be useful in emulsion points and lithographic inks.

U.S. Pat. No. 3,252,820 discloses a rheological composition of a co-ground mixture of a pigment extender and a thixotropic wax powder mixture of a polyamide of hydroxystearate with glyceryl trihydroxystearate. The extenders could be clay, talc, silica or titanium dioxide. The wax mixture and extender can be heated or melted together before grinding. The composition is used in paints. U.S. Pat. No. 3,313,713 discloses coated kaolin clay particles which can be corporated into polyester resins. The coating on the clay can be an amino amide formed from fatty acids and mixtures of polyethylene amines. The coated clay is formed by preparing a hydrosol containing a clay, adding some phosphoric acid, adding the specified amino acid and drying it at a temperature which is as high as 1400°F. The product is then screened to remove the larger particles. U.S. Pat. No. 3,354,111 discloses a pigment dispersion which is a suspension of a pigment dispersed with an amide. The reminder of the dispersion is an organic solvent. The amide is an N,N-dialkylamides. Those dispersions containing the organic solvent can be used for the production shaped articles such as plastic sheeting of synthetic linear polymers. U.S. Pat. No. 2,234,164 discloses leafable metal pigment flakes dispersed in an alkaline organic amino compound, e.g., dimethyl amine, and a higher fatty acid, forming neutral or basic salts. The result is a paste. The dispersion or paste can contain a hydrocarbon thinner. The method involves mixing, heating to solution form and coating to a paste. The pigment pastes are used in paint lacquer, varnish in other types of protective coatings. U.S. Pat. No. 3,197,425 discloses admixing a resin with a mixture of a pigment lubricated by an acid amide. The latter mixture is obtained by first admixing and by then coaloplex milling the pigment and amide before being placed in the admixture. The acid amide is a condensation product of alkanoamines and fatty acids. The admixture is used for the coloring of plastic resins material such as thermoplastic polyethylene. The coloring composition is admixed with the plastic resin and then sprayed in the extruder or blown to form sheets.

BROAD DESCRIPTION OF THE INVENTION

This invention involves a process of dry coloring and molding a shaped article of a thermoplastic resin. Unexpected results are obtained from the process by using a fatty acid amide coated pigment which is in particle form. The fatty acid amide encapsulates one or more individual pigment particles. The coated pigments are in a particle form, that is, granule or pellet, and is not in a powder form. When the coated pigments are molded with thermoplastic resins, a high degree of dispersion is obtained. The high degree of dispersion is produced by mixing the pigment with the fatty acid amide while the latter is in a melt state, with the introduction of low shear agitation, to form a homogeneous mixture. Due to the superior wetting action of the fatty acid amide, an extremely fine dispersion is formed in which the aggregates are easily separated to a colloidal type suspension. The fatty acid amide is then allowed to surround each individual crystal. Upon cooling, resolidification occurs, with the fatty acid amide encapsulating the pigment crystals and preventing them from reagglomerating.

The process of this invention results in a formed composition which is a thermoplastic material which contains the pigments coated with the fatty acid amides. The thermoplastic material preferably has been compressed into sheets. Generally, high molecular weight polymers are poor wetting vehicles for pigments. The melt viscosity of high molecular weight polymers do not provide a suitable media to separate the pigment aggregates without the introduction of high shear. The presence of aggregates are the major cause of specking, streaking, poor opacity, degradation of polymer physicals, and limitations of pigment concentrations. Applicant's produce pigment dispersions (fatty acid amide coated pigments) which are essentially free of pigment aggregates at uniquely high pigment concentrations. Satisfactorily pigmented compounds are produced by mixing applicant's dispersions with a suitable amount of uncolored polymer in low shear compounding equipment, etc. By the use of applicant's dispersions, brilliant reflected hues, increased opacity of opaque pigments, increased transparency of transparent pigments, and increased pigment concentrations of the polymer are obtained. In the molded thermoplastic compositions, applicant's coated pigments readily wet out which is one of the reasons the important advantages of this invention are achieved. Applicant is able to fully develop the color of the pigments.

Applicant can achieve pigment loadings of 5 to 90 percent by weight when inorganic pigments are used and from 5 to 75 percent by weight when organic pigments are used.

The process of applicant's invention involves two embodiments. The first embodiment is termed the cold casting process. In that process, melted fatty acid amide and pigment particles are admixed. The resultant fluid (creamy mass) is cooled so that the fluid solidifies, the fatty acid amide encapsulating the pigment particles. The cooling can be done by placing the resultant fluid in molds. The cooling is usually done by allowing the resultant fluid to cool to about room temperature. The solidified material is then particulated, e.g., by grinding, and sized, e.g., by screening, to remove the fines. The resultant coated pigment particles has all of the advantages discussed above. The resultant coated pigment particles are then molded with uncolored thermoplastic material by means, such as, an injection molder. The resultant formed colored thermoplastic material has all of the improved properties discussed above.

The second embodiment is termed the cold roller process. In that process, melted fatty acid amide and pigment particles are admixed. The resultant fluid (creamy mass) is passed through a heated low shear mixer, and preferably a continuous one, such as, a heated extruder, a Kneadmaster or some other turn screw heated mixer. The creamy mass must be kept at a temperature at or above the melting point of the fatty acid amide. The creamy mass is then solidified and formed by passing the creamy mass through cold and forming rollers. The cooling is usually done using rollers having a surface temperature of minus 10°C. Wafer-like flakes or material are produced that are extremely easy to handle, which is a very important advantage. The solidified wafer-like material is then particulated, e.g., by grinding, and sized, e.g., by screening to remove the fines. The resultant coated pigment particles has all of the advantages discussed above. The resultant coated pigment particles are then molded with uncolored thermoplastic material in means such as an injection molder. The resultant formed colored thermoplastic material has all of the improved properties discussed above. The cold roller process is preferred and is an improvement over the cold casting process.

The above are solvent-free processes, so the system does not need a drying step. Low shear processing steps can be used. By putting the pigment in a matrix, in an unagglomerated form, its color is developed to a greater degree. There does not appear to be any reaction of the fatty acid amide with the pigment. The fatty acid amide slides the pigment through the plastic when it is compounded with the thermoplastic material, so the pigment easily disperses in the thermoplastic material. Higher pigment loadings are obtained, as the bulk volume of the coated pigments is about one half of that known pigments.

DETAILED DESCRIPTION OF THE INVENTION

Fatty acid amides formed by condensation methods are well known in the art. The nitrogen atoms of primary or secondary amides are termed "amidizable nitrogen atoms" or "non-tertiary amines." The term non-tertiary amine means that only primary and secondary amines are encompassed by the term. When amines are condensed with fatty acids, fatty acid amides usually form; however esters may also develop in greater or lesser quantity. If the amines or alkylolamines used for the condensation contain two amidizable nitrogen atoms or one amidizable nitrogen atom and one hydroxyl group, the products of the process can also contain a plurality of fatty acid radicals bounded amidoidally and/or esteroidally in the molecule. This invention is mainly concerned with the amide linkage because it is the most effective molecular site for the dispersion of pigments. Molecules (entities) containing the mixed ester and amide linkages are less reactive. The amide linkage is predominately formed first because amines are much more reactive than hydroxyl groups, and also the manufacturing technique is usually through a melt polymerization of the acid-salt precursor to the Nylon 6/6 reaction. This invention is generally restricted to condensation products which contain amide linkages, or amide and ester linkages. Each molecule (entity) can contain a multiple of the amide and ester linkages, or a multiple of either. Some of the molecules need not contain amide linkages but only less than 20 percent of the molecules (entities) can contain only ester linkages, (and preferably none of the molecules contain only ester linkages). The term a fatty acid amide, as used herein, encompasses the above, including the restrictions placed on the presence of the ester linkages.

Typical subgeneric classes of useful amines are alkymonoamines, alkyldiamines, alkyltriamines, arylmonoamines, aryldiamines, cyclicalkylmonoamines, arylalkanolamines, and alkyalkanolamines; or terms such as aliphatic amines, cyclic amines and heterocyclic amines, primary alkyl amines, secondary alkyl amines, resin amines and polyamines, can be used for useful classes of amines. Branches and straight chain amines can be used. Mixtures of amines can be used. (Resin amines are derived from wood and gum resins.)

The amines used in preparing the fatty acid amides can be polyamines. Examples of useful polyamines are ethylene diamine, butylene diamine, hexylene diamine, propylene diamine, tetraethylene diamine, triethylene tetramine, octa methylene diamine, and tetraethylene pentanine. The diamines and triamines are preferred, the most preferred amine being ethylene diamine.

Useful primary alkyl amines have from 1 to 36 carbon atoms, examples of which are: methyl amine, ethyl amine, n-propyl amine, i-propyl amine, butyl amine, amyl amine, hexyl amine, hexadecyl amine, octadecyl amine, dodecyl amine, tridecyl amine, tetradecyl amine, pentadecyl amine, hexadecyl amine, heptadecyl amine, octadecyl amine, decyl amine, and eicosyl amine. Useful secondary alkyl amines include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, N-propyl-dodecyl amine, N-butyl dodecyl amine, N-amyl-dodecyl-amine, N-butyl-tridecyl amine, and N-amyl-tridecyl amine.

Useful alkyol amines are hydroxy ethyl amine, i-hydroxypropyl amine, n-hydroxypropyl amine and dihydroxypropyl amine. Alkylol amines having up to 3 hydroxyl groups are suited to the practice of this invention. It is preferred to use monohydric alkylol amines when alkylol amines are used. In the amines, if two radicals are linked to one nitrogen atom, the radicals can be the same or different for instance, one being an alkyl and one an alkylol radical or two alkyl groups of different chain length.

Examples of useful heterocyclic amines are the heterocyclic amines such as alkyl imidazolines and oxazolines. Examples of useful long chain amines are dodecyl diglycerol amine, and dodecyl methylglucamine.

Poly (fatty acid amides) derived from polymeric fatty acids and polyamines can be used. Such poly (fatty acid amides) normally have molecular weights of 3,000 to 10,000. Examples of poly (fatty acid amides) are those formed from ethylene diamine and polymerized linoleic acid and from diethylene triamine and polymerized oleic acid. Useful N-alkyl polyamines can be N-alkyl-1,3-diaminopropanes; N-dodecyl-1,3-diaminopropane N-tridecyl-1,3-diaminopropane; N-tetradecyl-1,3-diaminopropane; N-pentadecyl-1,3-diaminopropane; N-hexadecyl-1,3-diaminopropane; N-heptadecyl-1,3-diaminopropane; N-octadecyl-1,3-diaminopropane; N-nonadecyl-1,3-diaminopropane; N-eicosyl-1,3-diaminopropane; N-alkyl ethylene diamines; N-alkyl-1,3-diaminobutanes; N-alkyl-1,4-diaminobutanes; N-alkyl-1,3-diaminopentanes; N-alkyl-1,4-diaminopentanes; N-alkyl-5,5-diaminopentanes; N-alkyl-1,4-di aminohexanes; N-alkyl-1,5-diaminohexanes; and N-alkyl-1,6-diaminohexanes. N,N'-dialkyl polyamines are also useful.

The preferred amine compounds are saturated, i.e., do not contain double bonds in the chain. However, unsaturated compounds may be employed and include such compounds as dodecylenic amine, didodecylenic amine, N-dodecylenic ethylene diamine, N-dodecylenic-1,3-diaminopropane, oleic amine, dioleic amine, N-oleic ethylene diamine, N-oleic-1,3-diaminopropane, linoleic amine, dilinoleic amine, N-linoleic ethylene diamine, N-linoleic-1,3-diaminopropane.

The amine radical in the fatty acid amide preferably have from 0 to 36 carbon atoms.

Natural or synthetic fatty acids can be used to form the fatty acid amide. Mixtures of fatty acids can be used.

Useful fatty acids may be saturated or unsaturated. The saturated fatty acids are represented by the general formula: RCOOH, where R can be H or an alkyl group, branched or straight chain. Examples of saturated fatty acids are formic acid, acetic acid, propionic acid, n-butyric acid, isobutyric acid, N-valeric acid, n-caproic acid, n-heptoic acid, caprylic acid, n-nonylic acid, capric acid, undecylic acid, lauric acid, tridecylic acid, myristic acid, pentadecylic acid, palmitic acid, margaric acid, stearic acid, arachidic acid and behenic acid. Examples of unsaturated fatty acids are oleic acid, linoleic acid, linolenic acid, licanic acid, eleostearic acid, ricinoleic acid, clupanodonic acid and palmitoleic acid. The unsaturated fatty acids can be those containing one double bond, e.g., oleic acid, two double bonds, e.g., linoleic acid, three double bonds, e.g., eleostearic, etc.

Useful fatty acids which contain one or more hydroxyl groups in the acyl group of the fatty acid are, e.g., dihydroxystearic acid. Useful hydrogenated fatty acids are tallow fatty acids, castor oil fatty acids, rape oil fatty acids, peanut oil fatty acids and fish oil fatty acids. Polymeric fatty acids can be used. Polymeric fatty acids can be condensed with polyamines as described in U.S. Pat. No. 2,450,940 and U.S. Pat. No. 3,328,185.

The fatty acid radicals in the fatty acid amides preferably contain from 1 to 36 carbon atoms.

The term pigment means substances which are generally considered insoluble in the vehicle, and pigments generally have the property of light refractivity. (Dyes are considered soluble and generally have only the property of light absorption.) Phosphorescent, luminescent, fluorescent, metalescent, and pearlescent materials fit within the term pigment, as used herein and in the art. The pigment must be in particle form and should have a mean particle size between about 0.1 and about 100 microns and preferably between about 0.2 and about 50 microns. The most preferred mean particle size for organic pigments is about 0.2 microns. The most preferred particle size for inorganic pigments is about 50 microns.

Examples of organic and inorganic pigments which can be used in this invention are iron blue zinc oxide, titanium dioxide, chrome yellow, carbon black, chrome orange, chrome green, zinc chromate, red lead, lethol red, the lakes, azo type toners, phthalocyanines, aluminum hydrates, lakes, iron oxide, white lead, extenders, phosphotungstic acid toners, titanium-containing pigments, sulfur-containing pigments, extenders, calcium carbonate, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; organe toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes; e.g., acid blue 93; green lakes; brown lakes; and black lakes, e.g., natural black 3. Metallic pigments can be used, and examples are aluminum flakes. Mixtures of pigments can be used.

When the cold casting embodiment is used, the fatty acid amide is placed in a container, e.g., admixer or blender, and heated to or above its melting point. The pigment particles are added to the melted fatty acid amide and admixed. A creamy-appearing mass is obtained. Alternatively, the fatty acid amide can be melted and then placed in the admixer, which may or may not already contain the pigment. The melted fatty acid amide can be added at the same time that the pigment is added. The pigment and the fatty acid amide can be placed in the admixer, and then the amide melted. Any other combination is within the scope of this invention, including adding each or both a little at a time to the admixer. Agitation or some other admixing is necessary to assure good admixing or blending.

The creamy mass is then cooled so that it solidifies by either allowing it to return to, say, about room temperature, or by subjecting it to some form of cooling, such as, refrigeration. Cooling is normally done to about room temperature, but higher and lower temperatures can be used. Preferably the creamy mass is poured into molds, say about 1 ft. by 1 ft. and 2 inches deep, and then cooled. The solidified mass is then particulated by grinding by any suitable means. Knife type grinders are preferred. It may first be necessary to pulverize the solidified mass. The coated pigment mass is normally ground to a material having a mean particle size of about ⅛ to 3/16 inch. The material is then treated preferably by screening, so that the fine particles and dusts are removed by passage through a 1/16th inch screen. The grinding and screening can be done in a hopper arrangement which feeds the remaining coated pigment particles into an injection molder along with the thermoplastic material.

When the cold roller embodiment is used, the fatty acid amide is placed in a container, e.g., admixer or blender, and melted by and heated to or above its melting point. The pigment particles are added to the melted fatty acid amide and admixed. Agitation or some other admixing is necessary to assure good admixing or blending. Low shear agitation is preferred. A creamy-appearing mass is obtained. As discussed above under the cold casting embodiment, alternative methods of bringing the melted fatty acid amide and pigment together are within the scope of this invention. The admixture is passed through an extruder, preferably a heated extruder. The material is preferably extruded through a vented extruder with a compounding screw. The vent is desirable to eliminate any entrapped air.

The creamy mass is then passed through cooled forming rollers. The cooled rollers should have a surface temperature of room temperature or less, and preferably below 0°C. and even more preferably about minus 10°C. The creamy mass is solidified in this manner. Cooling is normally done to about room temperature but higher and lower temperatures are satisfactory. The operation of the cooled rollers is conventional and within the skill of those ordinarily skilled in the art. Preferably two rollers are used, although a group of cooling rollers and a group of forming rollers is very advantageous. The rolls (rollers) should be urged toward each other so as to provide a pressure of not less than 25 lbs. per linear inch and preferably of not less than 100 lbs. per linear inch. The rolls may be made of any suitable material such as wood, stone, plastic material, ceramic material or the like, or rolls faced with such material, but the rolls are made of metal as it is cheaper and easier to fabricate. The rolls are usually made of a hard material, iron or steel being suitable. The rollers usually have a 5 to 20 thousandths of an inch clearance, preferably about 10 thousandths of an inch clearance. The material coming out of the rollers is a semi-continuous sheet, i.e., solid wafer-like flakes. Those flakes are then particulated by grinding or by andy other suitable means. Knife type grinders are preferred. It may first be necessary to pulverize the solidified mass. The coated pigment mass is normally ground to a material having a mean particle size of about 3/16 inch. The material is then treated, preferably by screening, so that the fine particles and dusts are removed. The remaining material is further treated, preferably by passage through 1-1/16 inch screen, to remove the very large particles. The grinding and screening can be done in a hopper arrangement which feeds the remaining coated pigment particles into an injection molder along with the thermoplastic material. No solvent should be used in either embodiment when the fatty acid amide and the pigments are admixed and further processed. The coated pigment must be in a dry form when it is finally cooled, and when it is molded with the thermoplastic material.

Any thermoplastic material can be formulated with the coated pigments of this invention.

Examples of thermoplastics with which the pigment dispersions can be used are: the ABS resins prepared from acrylonitrile, butadiene and styrene; blends of ABC resins with other thermoplastics, such as, polyvinylchloride; resins prepared from acrylonitrile, butadiene, styrene and alpha methyl styrene.; resins prepared from butadiene, styrene and methacrylic acid; resins prepared from acrylonitrile, butadiene, styrene and methyl methacrylate acetal copolymers; acetal resins; acrylic resins and modified acrylic resins, such as, polymethyl methacrylate, copolymers of styrene and methyl methacrylate, copolymers of methyl methacrylate and alpha methyl styrene; the cellulosic plastics, such as, cellulose acetate plastics, cellulose acetate butyrate plastics, cellulose propionate plastics, ethyl cellulose plastics and cellulose nitrate plastics; mixtures of ethyl cellulose plastics and cellulose acetate butyrate; chlorinated polyether; the fluoroplastics such as, polytetrafluoroethylene, polyvinylidene fluoride, the fluorinated ethylene-propylene plastics and the chlorotrifluroethylene plastics; the phenoxy resins; the polybutadiene-type resins, such as, butadiene-styrene copolymer and polybutadiene; the polycarbonates; the polyethylene resins, such as, low-density polyethylene; copolymers of polyethylene with other materials; chlorinated polyethylenes; chlorosulfonated polyethylenes; ethylene vinyl acetate copolymer; ethylene acrylate copolymer; polyphenylene oxide; the polypropylenes; the polysulfones; the polystyrenes; styrene copolymers, such as, styrene-methyl methacrylate copolymer; and vinyl polymers and copolymers, such as, polyvinyl chloride, copolymer of vinyl chloride and vinyl acetate, copolymer of vinyl chloride, vinyl acetate and vinyl alcohol, copolymer of vinyl chloride and vinylidene chloride, and polyvinyldichloride.

Reinforced thermoplastics can be used. The reinforcing is normally done with glass fibers, fibrous asbestos, metal fibers, refractory fibers, and other fibers.

Various fillers can be used in the thermoplastics compositions. Examples of the fillers are calcium carbonate, carbon black, clay, asbestos, mica, talc, barium sulfate, magnesium oxide, barium carbonate, ground glass, and metal powders. It is noted that several of the filler are also listed as useful pigments. A material can be used as a pigment and a filler, but when it is used as a pigment it must have been treated with the fatty acid amide.

The thermoplastic compositions can contain other conventional materials, such as, plasticizers, stabilizers, flame retardants, UV absorbers, antistatic additives, etc.

The coated pigment can contain from about 10 to about 90 percent by weight of pigment and from about 90 to about 10 percent by weight of fatty acid amide, although the preferred amount of pigment is 30 to 75 percent by weight and the preferred amount of fatty acid amide is 70 to 25 percent by weight. Between about 0.1 and about 10 parts by weight of the coated pigment can be formulated 100 parts by weight of the thermoplastic, although the preferred amount of coated pigment is 0.5 to 3.0 parts by weight per 100 parts by weight of the thermoplastic.

The coated pigments include an individual pigment encased in the vehicle or several individual pigments encased in the vehicle, but there is no agglomeration of the pigments in the vehicle. This allows better physical properties than previously attained in the prior art. (During the setting and cooling, the fatty acid amide or "vehicle" encases each pigment particle and then the fatty acid amide solidifies around the encapsulated pigment particles. If the pigment is not micro pulverized there is a distinct possibility of agglomerated pigments being encapsulated, however the concept in this invention is that one or more unagglomerated particles are bound to make up a particle, say of, 3/16th of an inch.) There is development of essentially the full color potential of the pigments. This is achieved through the superior wetting action of the fatty acid vehicle. Also, extremely high pigment loadings are possible with the coated pigments, for example, 100 parts of coated pigment to one part of resin. Typical pigment concentrations presently being prepared by the coloring industry range between five and fifty percent by weight pigment. This is the most pigment which can be practically compounded into a vehicle by the prior art methods and pigments. The use of applicant's coated pigment can attain a pigment level up to ninety percent by weight. This high level is unique with in the industry. One reason that it this is possible to reduce the bulk density of the applicants' coated pigment to about one half of the bulk density of prior art pigment formulation.

The coated pigment is dustless, which is extremely important in a commercial sense. The coated pigment are not drawn together by standing or due to vibration, the latter is very important when automated coloring systems are used.

In both embodiments, the coated pigment particles (after being sized) are prepared and then molded with uncolored thermoplastic resin particles in or by some low-shear compounding means, such as, an injection molder, rotational casting means, blow molding machinery, extruder, Banbury-type mechanical mixer and compounding rolls. (High shear compounding means can be used, but is not necessary or preferred.) The final product can have any shape, such as, film, sheet, rod, filament, cubical, spherical, etc. The final product can even be foamed. Thus the dry coloring of molded thermoplastic material is achieved without the use of high shear as is necessary in the prior art methods and with prior art pigments.

The following specific examples illustrate the invention, but the invention is not limited to the specific examples.

EXAMPLE 1

50 grams of hydroxystearic acid ethylenediamide were placed in a resin kettle and melted at 200°C. The amide was gently agitated. 150 grams of cadmium sulfide yellow was slowly added to the melted amide and a thick creamy paste was obtained. The paste was then passed through a pair of cold rollers which had a nip distance of 0.01 inch and had surface temperatures of −10°C. The paste was solidified (it was cooled to room temperature by passing it through the cold rollers) and was in semicontinuous form. The solidified sheets were ground into wafer-like fragments which had average dimensions of 3/16 inch by 0.010 inch. The grinding operation delivered in a product which was screened to eliminate any traces of dust as well as very tiny, uncommercially acceptable, fragmentary, particles. The product was thin comprised of wafer-like particles which had a length of about 3/16th of an inch. The bulk volume of the treated pigment was about one half that of an equal weight of the untreated pigment. The fragments were compounded in a screw injection molding machine with enough polypropylene particles to prepare a formulation having 10 parts of the pigment to 100 parts of the polypropylene. A one mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 2

Example 1 was repeated except that the nip distance of the cooled rollers was 0.005 inch. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 3

50 grams of hydroxystearic acid ethylenediamide were placed in a resin kettle and melted at 200°C. The amide was gently agitated. 25 grams of phthalocyanine blue was slowly added to the melted amide and a thick paste was obtained. The paste was then passed through a pair of cold rollers which had a nip distance of 0.008 inch and had surface temperatures of −10°C. The paste was solidified (it was cooled to room temperature by passing it through the cold rollers) and was in semicontinuous sheet form. The solidified sheets were ground into wafer-like fragments which had average dimensions of 3/16 inch by 0.010 inch.

The grinding operation delivered a product which was screened to eliminate any traces of dust as well as very tiny uncommercially acceptable, fragmentary, particles. The product was thin comprised of wafer-like particles which had a length of about 3/16th of an inch. The bulk volume of the treated pigment was about one half of an equal weight of the untreated pigment. The fragments were compounded in a screw injection molding machine with enough polypropylene particles to prepare a formulation having 10 parts of the pigments to 100 parts of the polypropylene. A one mil thick film was prepared by passing the formulation through a compression press. When the film was viewed through a microscope, no aggregates were visible. Spectrophotometric analysis showed a higher peak of reflectance than conventionally prepared dispersions. The color of the film did not have any unwanted sheen but was intense and lustrous; and the color and its hue was fully developed and did not have any fading as found in prior art pigmented thermoplastics. Much higher than prior art pigment loading in the thermoplastic was achieved.

EXAMPLE 4

A mixture of polyamines was condensed with a mixture of polymerized linoleic and oleic acid to form a polyamide. 50 grams of the polyamide was placed in a resin kettle and melted to 380°C. The polyamide was agitated. 150 grams of cadmium sulfide yellow was slowly added to the melted amide, and a thick creamy paste was obtained. The paste was then treated as in Example 1 and a sheet of pigment thermoplastic was obtained.

EXAMPLE 5

Example 1 was repeated except that the paste melted at 200°C. in the resin pot was allowed to drop in temperature to room temperature by itself (without passing it through cold rollers). The paste was solidified and was in granular form. The granular material was ground. The granules of this example had a volume that was about twice that of the ground wafer-like fragments of Example 1.

EXAMPLE 6

Example 1 was repeated except that the heated thick paste of the hydroxstearic acid ethyleneamide and cadmium sulfide yellow was allowed to return to room temperature by itself without passing it through the cooled rollers. The cooled material was granular, and was not in wafer form, before being ground.

EXAMPLE 7

50 grams of hydroxystearic acid ethylenediamide were placed in a resin kettle and melted at 200°C. The amide was gently agitated. 150 grams of cadmium sulfide yellow was slowly added to the melted amide and a thick creamy paste was obtained. The creamy paste was placed in several low molds and allowed to solidify by cooling to room temperature. The solidified material was then particulated by passing it through a knife blade grinder. The fines and dust were screened out and then the over-sized particles were removed by passing them through a 1-1/16 inch screen. The bulk volume of the treated pigment was about one half that of an equal weight of the untreated pigment. Particles were compounded in a screw injection molding machine with enough polypropylene particles to prepare a formulation having 10 parts of the pigment to 100 parts of the polypropylene. A one mil thick film was prepared by passing the formulation through a compression press. When the film was view through a microscope, no aggregates were visible. The color of the film was exceptional.

EXAMPLE 8

Example 7 was repeated except that the creamy paste was kept in one container and was cooled to room temperature by placing the container in a refrigerator. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading in the thermoplastic was achieved.

EXAMPLE 9

Example 7 was repeated except that 35 parts of clay (as a filler) was compounded with the polypropylene and the coated pigment. When the film was viewed through a microscope, no aggregates were visible. Spectrophotometric analysis showed a higher peak of reflectance than conventionally prepared dispersions. The color of the film did not have any fading as found in prior art pigmented thermoplastics. Much higher than prior art pigment loading was achieved.

EXAMPLE 10

Example 1 was repeated except that 6.8 grams of the monoamide dimer from hydroxystearic acid ethylenediamine was used in place of the trimer formed from the diamide of hydroxystearic acid ethylenediamine and that 38.6 grams of titanium dioxide ($TiO_2$) was used instead of the cadium sulfide yellow. The resultant fatty acid amide had the following physical characteristics:

| | |
|---|---|
| Melting range: | 210° to 212°F |
| Moisture: | 0.3 to 0.7 percent |
| Ash content: | 99.29 percent |
| Sp. Gr.: | 2.56 |
| Bulk volume: | ⅔ reduction factor (when compared with an equal weight of the untreated pigment) |

EXAMPLE 11

The ash content of 5 grams of pure titanium dioxide (used as the control) was 99.96 percent. The ash content of 5 grams of the invention coated pigment of Example 10 was 99.29 percent. The ash content of 5 grams of white concentrate PMS 350 nmb White (which is the commercial designation for a typical prior art pigment formulation, the non-ash portion of which contained 10 percent of titanium dioxide and 90 percent of styrene) was 9.2 percent. A comparison of the above ash content indicates the total percent solids in each pigment system. It can be deduced that the ash content of the invention coated pigment of Example 10 approaches the same level as the dry color pigment, therefore, its percent solids is almost equal to that of the dry pigment ($TiO_2$). This cannot be duplicated by the prior art.

EXAMPLE 12

Example 10 was repeated. The resultant coated pigment by means of visual inspection, occupied about one-third the space of its initial dry admixed ingredients. The specific gravity of the coated pigment and its initial dry admixed ingredients indicated the same numerical value, however, the bulk volume of the coated pigment was greatly decreased. This decrease in bulk volume made it possible to disperse much more pigment in a thermoplastic material when injection molding equipment is used. Ten pounds of the coated pigment was easily compounded in 100 pounds of polypropylene. This result is not possible in the prior art when injection molding, etc., is used.

EXAMPLE 13

Example 1 was repeated except that 0.10 grams of Cyan Green (phthalocyanine type pigment) was used and 0.233 grams of the dimer from hydroxystearic acid ethylenediamine was used. A spectrographic analysis resulted in a Y-illuminant C value of 3.54 for the invention coated pigment. The Y value represents X' which is the value of ones color: Value indicating the dark to light - black to white factor, relative brightness or intensity.

An equivalent weight amount of Cyan Green and a simple cold mixture of hydroxystearic acid diethylenediamine was formulated in the same manner as above with the same amount of polypropylene. A spectrographic analysis resulted in a X' value of 6.24. The product containing the invention coated pigment had a much more intense color than the product containing the admixture of pigment and hydroxystearic acid ethylenediamine. This indicated better dispersion of the invention coated pigment.

An equivalent amount (weight) of Cyan Green was formulated in the same manner as above with the same amount of polypropylene. A spectrographic analysis resulted in a X' value of 7.46. The product containing the invention coated pigment had a much more intense color than the product containing Cyan Green. This indicated better dispersion of the invention coated pigment.

A lower X' value indicates a relatively better color value or more intense color.

Visual inspection of the above samples confirmed that much more intense color was possessed by the product containing the invention coated Cyan Green.

Slides of the product containing Cyan Green and of the product containing the invention coated Cyan Green were prepared. Microscopic examination established the presence of large agglomerates in the product containing Cyan Green and showed a much better dispersion in the product containing the coated Cyan Green.

What is claimed is:

1. A process for dry coloring and molding a shaped article of a thermoplastic resin having highly developed color and the hue and intense and lustrous color comprising:
   a. admixing in compounding means, while avoiding agglomeration,
      i. micropulverized pigment particles having a size of 0.1 to 100 microns, and
      ii. a molten fatty acid amide having amine radicals containing up to 36 carbon atoms and fatty acid radicals containing 1 to 36 carbon atoms, said fatty acid amide being solid at room temperature, and said fatty acid amide being unsubstituted or substituted by hydroxyl,
      said admixing step (a) not utilizing any solvent, said admixture containing from about 10 to about 90 percent by weight of said pigment and from about 90 to about 10 percent by weight of said fatty acid amide;
   b. cooling said admixture to solidification wherein each particle of said pigment is encased within said solidified fatty acid amide, said admixture being in dry form;
   c. particulating said solidified admixture, particles of said solidified admixture being obtained;
   d. screening said particles of said solidified admixture to remove the fines portion of said particles of said solidified admixture from said particles of said solidified admixture;
   e. mixing said screened particles of said solidified admixture in dry form with uncolored thermoplastic resin particles, said mixture containing from about 0.1 of said screened particles of said solidified admixture per 100 parts of said thermoplastic resin to 100 parts of said screened particles of said solidified admixture per one part of said thermoplastic resin; and
   f. injection molding said mixture (e) into a colored and shaped article by means of an injection molding machine, said injection molding step rendering said thermoplastic resin fluid so as to cause it to be flowable, whereupon said encased pigments uniformly disperses in said fluid thermoplastic resin, and subjecting said fluid thermoplastic resin having said encased pigments uniformly dispersed therein to molding pressure,
   said molding step (f) not utilizing any solvent; and
   g. cooling said injected molded mixture (f) until it solidifies.

2. A process for dry coloring and molding a shaped article of a thermoplastic resin having highly developed color and hue and intense and lustrous color comprising:
- a. admixing in compounding means, while avoiding agglomeration,
  - i. micropulverized pigment particles having a size of 0.1 to 100 microns, and
  - ii. a molten fatty acid amide having amine radicals containing up to 36 carbon atoms and fatty acid radicals containing 1 to 36 carbon atoms, said fatty acid amide being solid at room temperature, and said fatty acid amide being unsubstituted or substituted by hydroxyl, said admixing step (a) not utilizing any solvent, said admixture containing from about 10 to about 90 percent by weight of said pigment and from about 90 to about 10 percent by weight of said fatty acid amide;
- b. passing said admixture through a heated mixer, said admixture being at a temperature at or above the melting point of said fatty acid amide;
- c. cooling said admixture until it is in a solidified state by passing said fluid admixture through cooled rollers, whereby solid flattened flakes are formed and each of said pigment particles are encapsulated by said fatty acid amide, said cooled rollers having a surface temperature of room temperature or less, said cooled rollers having a roller pressure of not less than 25 p.s.i.;
- d. particulating said solid flattened flakes, of said solidified admixture particles of said solidified admixture being obtained;
- e. screening said particles of said solidified admixture to remove the fines portion of said particles of said solidified admixture from said particles of said solidified admixture;
- f. mixing said screened particles of said solidified admixture in dry form with uncolored thermoplastic resin particles, said mixture containing from about 0.1 of said screened particles of said solidified admixture per 100 parts of said thermoplastic resin to 100 parts of said screened particles of said solidified admixture per one part of said thermoplastic resin; and
- g. injection molding said mixture (f) into a colored and shaped article by means of an injection molding machine, rendering said thermoplastic resin fluid so as to cause it to be flowable, whereupon said encased pigments uniformly disperses in said fluid thermoplastic resin, and subjecting said fluid thermoplastic resin having said encased pigments uniformly dispersed therein to molding pressure, said molding step (f) not utilizing any solvent; and
- h. cooling said injected molded mixture (g) until it solidifies.

* * * * *